(12) United States Patent
Shimizu

(10) Patent No.: US 12,330,414 B2
(45) Date of Patent: Jun. 17, 2025

(54) IMAGE READING APPARATUS

(71) Applicant: BROTHER KOGYO KABUSHIKI KAISHA, Nagoya (JP)

(72) Inventor: Yoshikazu Shimizu, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 217 days.

(21) Appl. No.: 18/156,574

(22) Filed: Jan. 19, 2023

(65) Prior Publication Data

US 2024/0157713 A1 May 16, 2024

(30) Foreign Application Priority Data

Nov. 15, 2022 (JP) ................................. 2022-182263

(51) Int. Cl.
| | |
|---|---|
| *B41J 11/04* | (2006.01) |
| *B41J 11/00* | (2006.01) |
| *B41J 11/057* | (2006.01) |
| *B65H 20/02* | (2006.01) |
| *H04N 1/04* | (2006.01) |
| *B41J 2/01* | (2006.01) |

(52) U.S. Cl.
CPC ........ *B41J 11/007* (2013.01); *B41J 11/00212* (2021.01); *B41J 11/008* (2013.01); *B41J 11/04* (2013.01); *B41J 11/057* (2013.01); *B65H 20/02* (2013.01); *H04N 1/04* (2013.01); *B41J 2/01* (2013.01)

(58) Field of Classification Search
None
See application file for complete search history.

(56) References Cited

U.S. PATENT DOCUMENTS

| | | | |
|---|---|---|---|
| 9,004,640 B2* | 4/2015 | Ishikawa | B41J 11/0095 347/19 |
| 10,338,511 B2* | 7/2019 | Kawatsu | B65H 5/062 |
| 2023/0007129 A1* | 1/2023 | Sunada | H04N 1/00649 |

FOREIGN PATENT DOCUMENTS

JP 2000-090317 A 3/2000

* cited by examiner

*Primary Examiner* — Leslie J Evanisko
*Assistant Examiner* — Thomas Ray Knief
(74) *Attorney, Agent, or Firm* — Merchant & Gould P.C.

(57) ABSTRACT

An image reading apparatus includes a housing having a conveying path, a recording head, a first transport roller pair located downstream of the recording head, a second transport roller pair located downstream of the first conveying roller pair, a reading unit located between the first transport roller pair and the second transport roller pair, a sheet support portion facing the reading unit, a glass plate located between the reading unit and the sheet support portion, and a rotating body located at a first position or a second position. The rotating body has a plurality of projections projecting radially outwardly. A distal end of one of the plurality of projections is positioned closer to the sheet support portion than the glass plate.

7 Claims, 6 Drawing Sheets

IMAGE READING APPARATUS

REFERENCE TO RELATED APPLICATIONS

This application claims priority from Japanese Patent Application No. 2022-182263 filed on Nov. 15, 2022. The entire content of the priority application is incorporated herein by reference.

BACKGROUND ART

A known image reading apparatus includes an image sensor. The image sensor reads an image on a sheet conveyed along a conveying path. The image sensor has a casing. The lower surface of the casing is open. A light source, a lens, and a light receiving unit are located in the casing. The opening of the casing is sealed by a glass plate. The casing is held by a holding member attached to an upper housing. The holding member comprises a bottom plate. The bottom plate has a translucent hole. Light is emitted from the image sensor, passes through the translucent hole, and is received on the image sensor. Since there is a base plate between the glass plate and the sheet, the glass plate is away from the sheet. As a result, the undried ink on the sheet may not contact the glass plate.

DESCRIPTION

The base plate may contact undried ink on the sheet. Due to contact with the base plate, undried ink may spread on the sheet, and the image of the sheet may be disturbed.

The present disclosure provides an image reading apparatus in which an undried liquid on a sheet may not contact with a reading unit.

An image reading apparatus according to the present disclosure includes a housing, a recording head, a first transport roller pair, a second transport roller pair, a reading unit, a sheet support portion, a glass plate, and a rotating body. The housing has a conveying path extending in a conveying direction. The first transport roller pair is located downstream of the recording head in the conveying direction. The second transport roller pair is located downstream of the first transport roller pair in the conveying direction. The reading unit is located between the first transport roller pair and the second transport roller pair in the conveying direction. The sheet supporting portion faces the reading unit. A glass plate is located between the reading unit and the sheet support portion. In the conveying direction, the rotating body is located at a first position or a second position. The first position is between the first transport roller pair and the reading unit. The second position is between the reading unit and the second transport roller pair. The reading unit has a light source for irradiating the support portion with light through the glass plate, and a light receiver for receiving light through the glass plate. The rotating body has a plurality of projections projecting radially outwardly. The distal end of one of the plurality of projections is positioned closer to the sheet support portion than the glass plate.

According to the present disclosure, the undried liquid on the sheet does not come into contact with the reading unit. As a result, the image recorded on the sheet is less likely to be disturbed.

FIG. 1A is a perspective view schematically showing an appearance of a printer 10, and FIG. 1B is a perspective view schematically showing a printer 10 in which a housing cover 13 is in an open position.

Figure 5:
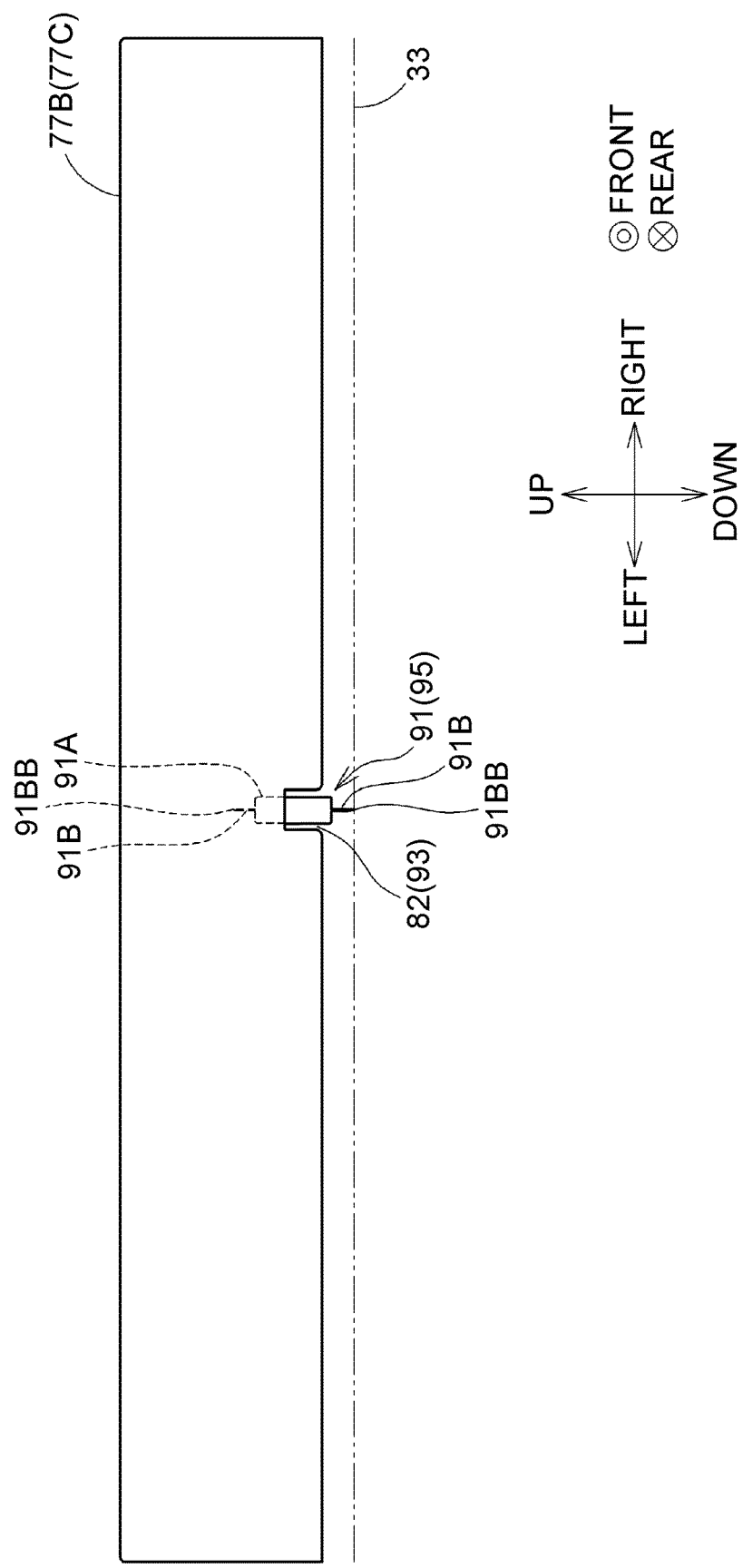

FIG. 5 is a schematic view showing a state in which the fourth spur roller 91 is positioned at the center in the left-right direction 9 of the conveying path 33.

Figure 6:
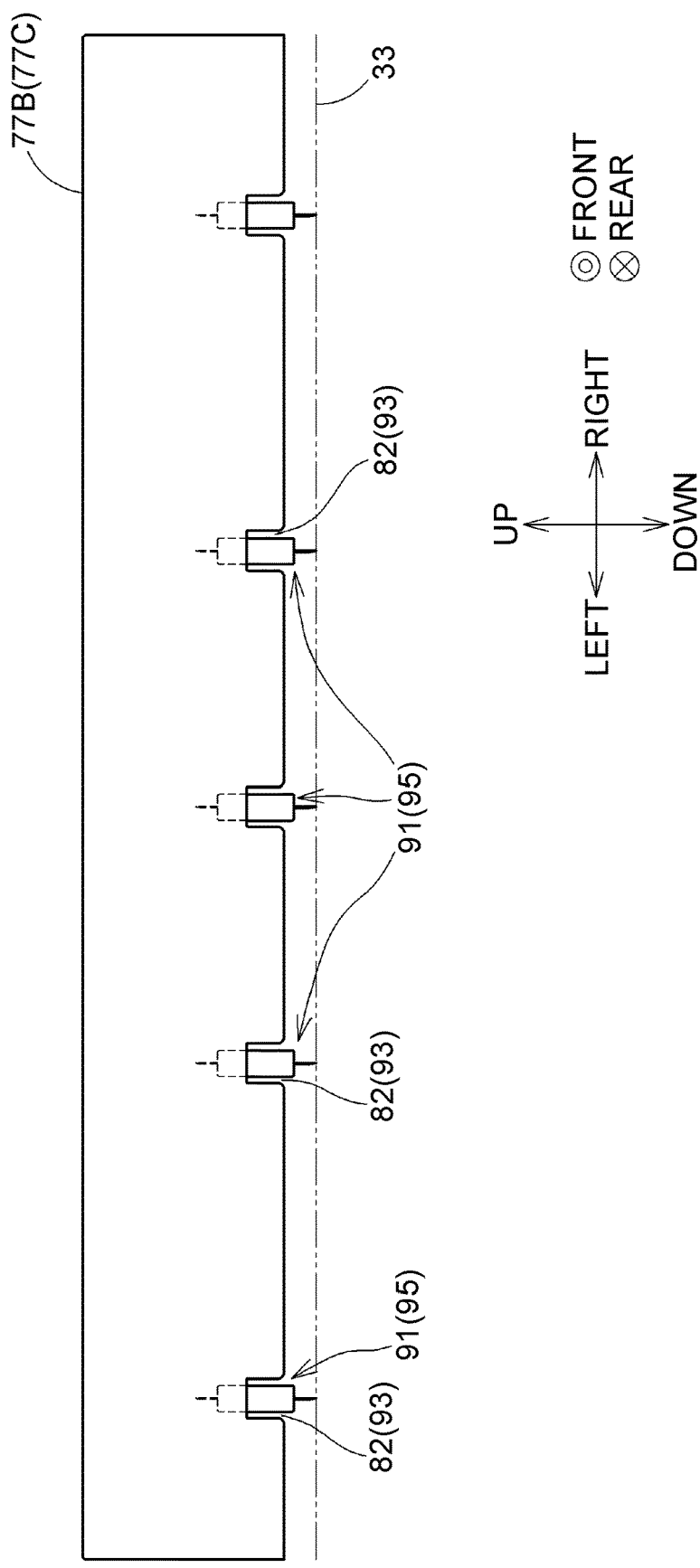

FIG. 6 is a schematic view showing a state in which a plurality of fourth spur rollers 91 are positioned at intervals in a left-right direction 9.

A printer 10 according to an embodiment of the present disclosure is described below. Embodiments described below are merely examples of the present disclosure, and the embodiments may be modified as appropriate without changing the gist of the present disclosure.

Figure 1A:
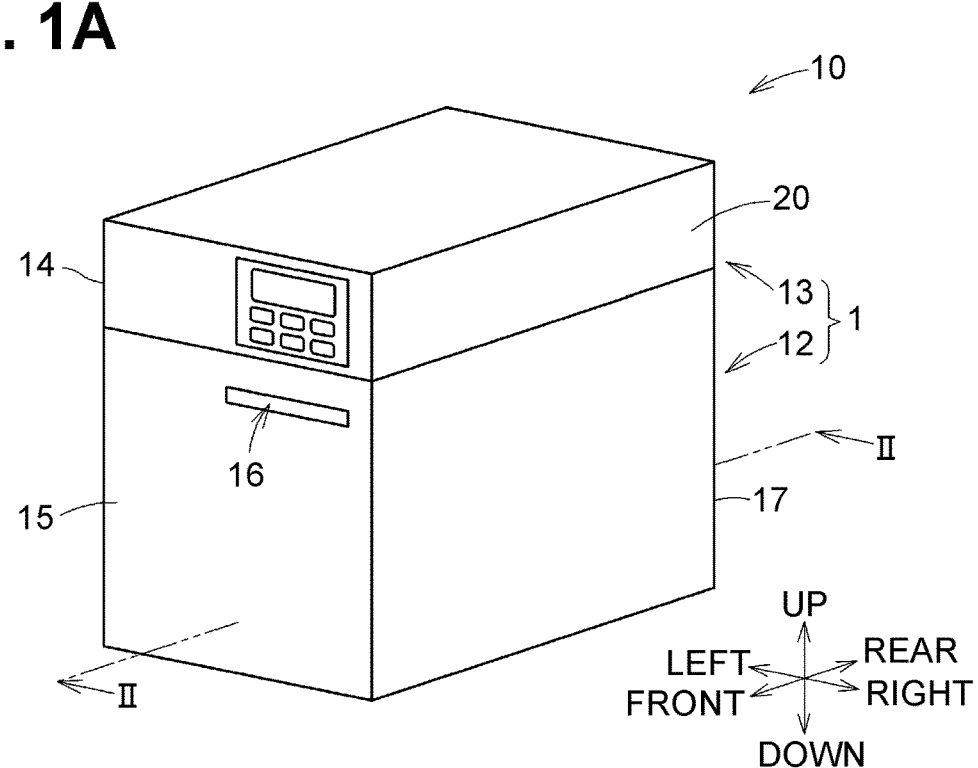

As shown in FIG. 1A, the vertical direction is defined with reference to a state in which the printer 10 is placed so that it can be used. The front-rear direction is defined such that a surface where a discharge port 16 is located is at the front. A left-right direction is defined as the printer 10 is viewed from the front. The left-right direction is an example of the crossing direction.

Figure 1B:
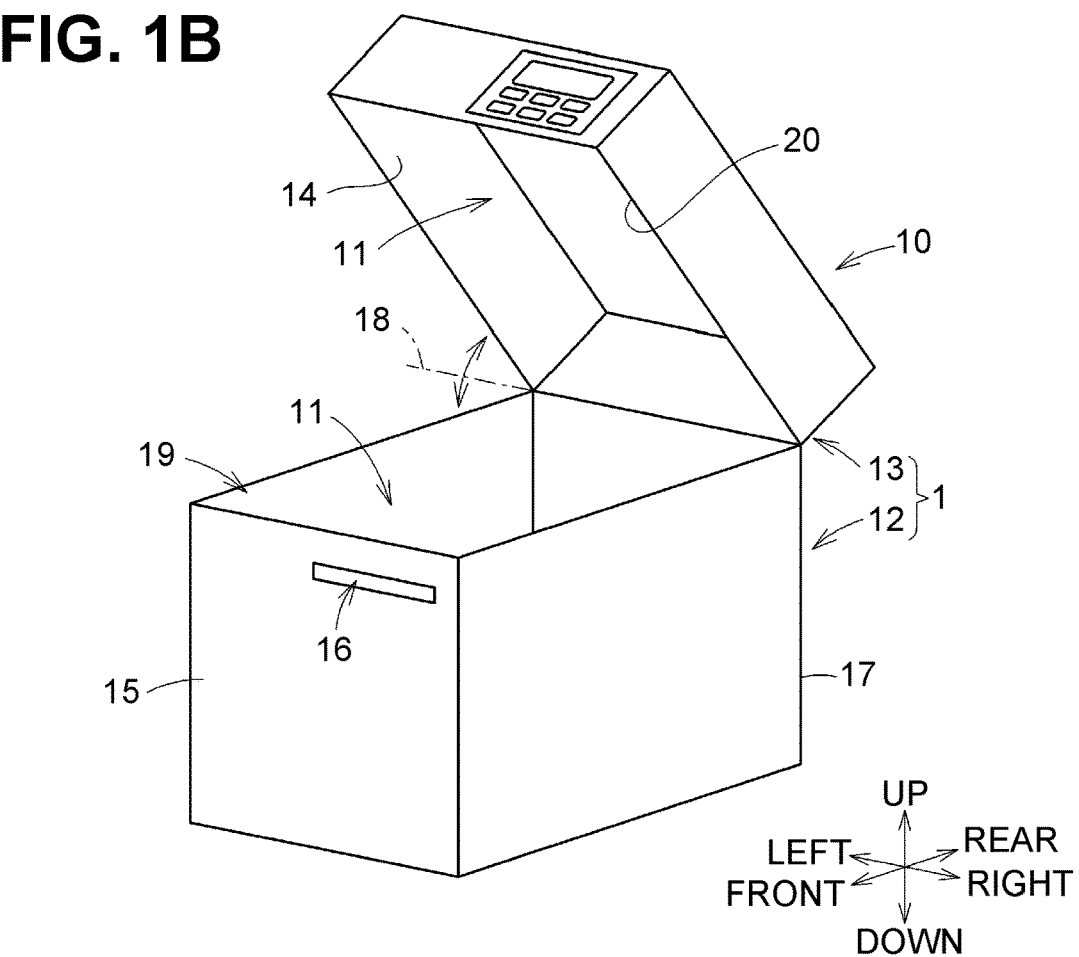
Figure 2:
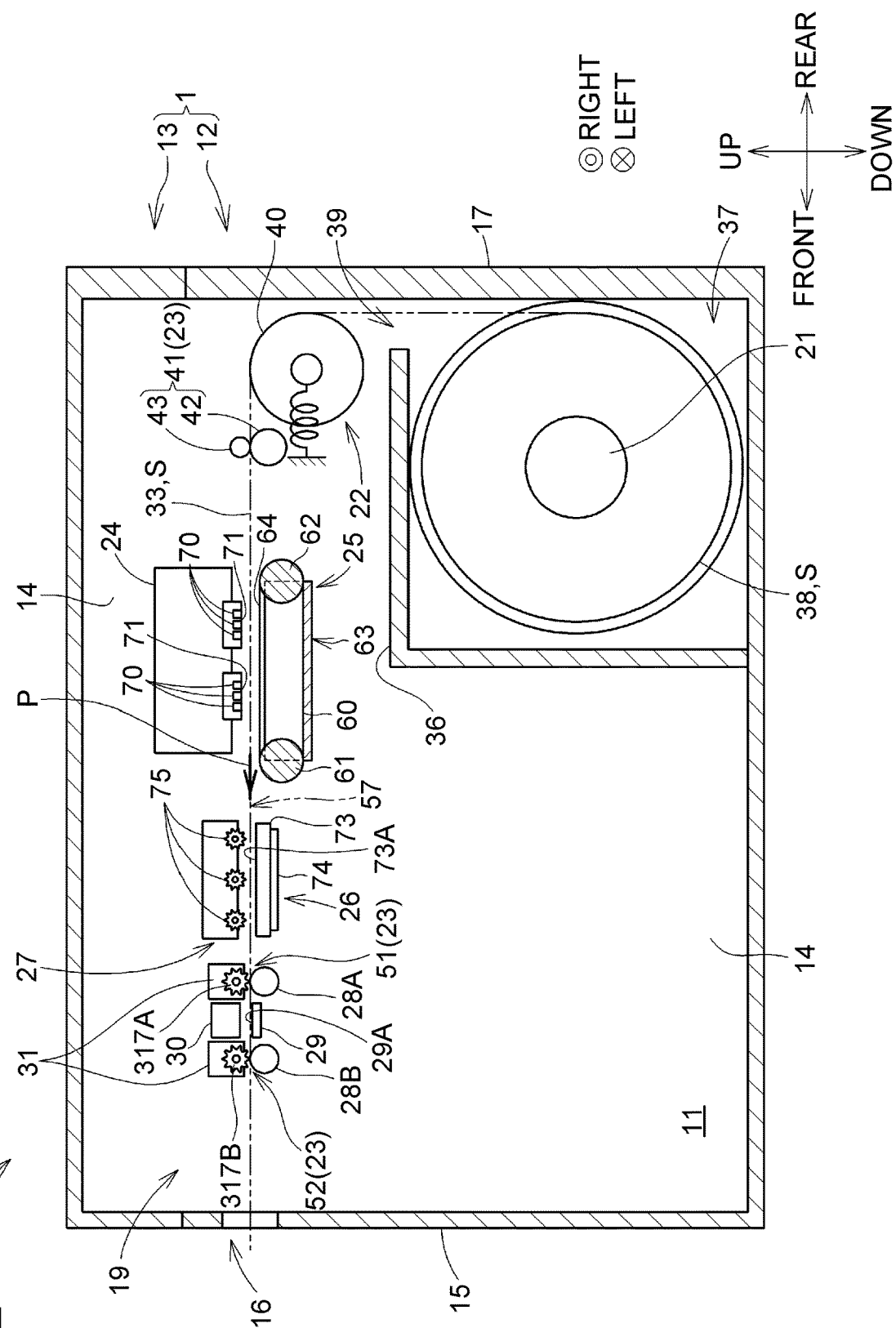
FIG. 2 is a schematic view showing a longitudinal section of printer 10 along line II-II of FIG. 1A.

As shown in FIGS. 1A, 1B and 2, the printer 10 is configured to record an image on a sheet S, using an inkjet recording method. The printer 10 is an example of an image reading apparatus.

[Exterior Configuration of Printer 10]

The printer 10 has a housing 1. The housing 1 has a substantially rectangular parallelepiped shape. There is an inner space 11 inside the housing 1. The housing 1 comprises a housing case 12 and a housing cover 13.

The discharge port 16 is located on a front wall 15 of the housing case 12. The discharge port 16 is a through hole having a rectangular shape elongated in the left-right directions. The housing cover 13 is attached to a rear wall 17 of the housing case 12 with a bearing and a shaft.

The housing cover 13 pivots about a rotation axis 18 of the shaft between a closed position and an open position. FIG. 1A shows the housing cover 13 in the closed position. FIG. 1B shows the rotation axis 18 of the shaft and the housing cover 13 in the open position. The rotation axis 18 extends in the left-right direction. The housing cover 13 in the closed position closes an opening 19 at an upper end of the housing case 12. The housing cover 13 in the open position opens the opening 19. FIG. 1B does not show the configuration inside the housing 1. In the following description, unless otherwise specified, the term "housing cover 13" means "housing cover 13 in the closed position".

[Interior Configuration of Printer 10]

As shown in FIG. 2, the printer 10 includes a roll holder 21, a tensioner 22, a conveying unit 23, a recording head 24, a support mechanism 25, a heater 26, a heater cover 27, a reference plate 29, a CIS unit 30, and a spur holder unit 31 in the inner space 11. "CIS" is an abbreviation for "Contact Image Sensor". The heater 26 is an example of a heater. The reference plate 29 is an example of a sheet support portion. The CIS unit 30 is an example of a reading unit. The spur holder unit 31 is an example of a second support member.

[Roll Holder 21]

A sheet accommodation space 37 is defined by a partition wall 36 on the rear side and on the lower side in the inner space 11. A first frame for supporting the roll holder 21 is in the sheet accommodation space 37. The roll holder 21 is supported by the first frame in the sheet accommodation space 37. A roll body 38 is mounted on the roll holder 21. The roll body 38 has a core tube and a sheet S wound around the core tube. The roll body 38 may be a rolled sheet S without a core tube. Instead of the roll holder 21, fanfold paper or a stack of cut sheet may be accommodated in the sheet accommodation space 37. Between the rear end of the partition wall 36 and the rear wall 17 is a gap 39 through which the sheet S passes. The sheet S is pulled out from the roll body 38 and passes through the gap 39. The sheet S from the roll body 38 is hung on the tensioner 22.

[Tensioner 22]

The tensioner 22 is located above the partition wall 36 and near the rear wall 17. The tensioner 22 extends in the left-right direction and is supported by two second frames positioned near left and right ends in the inner space 11. The tensioner 22 is urged backward by a spring. The tensioner 22 is movable in the front-rear direction. The tensioner 22 has a curved surface 40 that bulges rearward. The sheet S from the roll body 38 is hung on the curved surface 40 from below, passes through an upper end of the curved surface 40, and extends toward a conveying roller pair 41 positioned in front of the tensioner 22. When the sheet S hung on the curved surface 40 is conveyed in a forward direction by the conveying roller pair 41, the tensioner 22 applies backward tension to the sheet S.

[Conveying Unit 23]

The conveying unit 23 conveys the sheet S along a conveying path 33. The conveying unit 23 conveys the sheet S from the roll body 38 to the discharge port 16. The conveying unit 23 includes the conveying roller pair 41, a first transport roller pair 51, and a second transport roller pair 52. The first transport roller pair 51 is an example of a first transport roller pair. The second transport roller pair 52 is an example of a second transport roller pair.

As shown in FIG. 2, the conveying path 33 is formed in the inner space 11. The conveying path 33 extends upward from the roll body 38, and then extends forward from an upper end of the tensioner 22 to reach the discharge port 16. That is, a conveying direction P in which the sheet S is conveyed between the roll body 38 and the tensioner 22 is upward, and the conveying direction P between the tensioner 22 and the discharge port 16 is forward.

The conveying roller pair 41 is positioned in front of the tensioner 22. The conveying roller pair 41 includes a drive roller 42 and a pinch roller 43. The drive roller 42 is positioned below the conveying path 33. The drive roller 42 extends in the left-right direction. The drive roller 42 is supported by a third frame so as to be rotatable about an axis extending in the left-right direction. The drive roller 42 is rotated by a driving force transmitted from a motor. The pinch roller 43 is positioned above the conveying path 33. The pinch roller 43 abuts against an upper end of the drive roller 42 from above. The conveying roller pair 41 transports the sheet S in the forward direction while nipping the sheet S between the drive roller 42 and the pinch roller 43.

The first transport roller pair 51 is positioned behind the CIS unit 30 and in front of the heater 26. The first transport roller pair 51 includes a first driving roller 28A and a first spur roller 317A. The first driving roller 28A extends in the left-right direction. The first driving roller 28A is supported by the third frame so as to be rotatable about an axis extending in the left-right direction. The first driving roller 28A is rotated by a driving force transmitted from the motor. The first spur roller 317A is supported by the spur holder unit 31 so as to be rotatable about an axis extending in the left-right direction. A plurality of first spur rollers 317A may be positioned at intervals in the left-right direction. The spur holder unit 31 will be described later. The first transport roller pair 51 conveys the sheet S in the forward direction in a state in which the first driving roller 28A abuts against a lower surface of the sheet S and the first spur roller 317A abuts against an upper surface of the sheet S, that is, in a state in which the sheet S is nipped between the first driving roller 28A and the first spur roller 317A. The first spur roller 317A is an example of a first driven roller.

The second transport roller pair 52 is positioned in front of the CIS unit 30 and behind the discharge port 16. The second transport roller pair 52 includes a second driving roller 28B and a second spur roller 317B. The second driving roller 28B extends in the left-right direction. The second driving roller 28B is supported by a fourth frame so as to be rotatable around an axis extending in the left-right direction. The second driving roller 28B is rotated by a driving force transmitted from the motor. The shape and size of the second spur roller 317B are the same as those of the first spur roller 317A. The second spur roller 317B is supported by the spur holder unit 31 so as to be rotatable about an axis extending in the left-right direction. A plurality of second spur rollers 317B may be positioned at intervals in the left-right direction. The second transport roller pair 52 conveys the sheet S in the forward direction in a state in which the second driving roller 28B abuts against the lower surface of the sheet S and the second spur roller 317B abuts against the upper surface of the sheet S, that is, in a state in which the sheet S is nipped between the second driving roller 28B and the second spur roller 317B. The second spur roller 317B is an example of a second driven roller.

[Recording Head 24]

The recording head 24 is supported by the fourth frame at a position in front of the pinch roller 43 and above the support mechanism 25. A lower surface of the recording head 24 is a nozzle surface 71 having a plurality of nozzles 70 open. The recording head 24 receives ink supplied from an ink tank via a tube. The ink contains water, pigments and fine particles of thermoplastic resin, and requires to be heated for fixing the ink on the sheet S. The recording head 24 discharges ink from the plurality of nozzles 70 toward the sheet S supported by the support mechanism 25. As a result, an image in ink is recorded on a recording surface of the sheet S. Ink is an example of a liquid.

[Support Mechanism 25]

The support mechanism 25 is positioned in front of the conveying roller pair 41 and directly below the recording head 24, and is supported by a fifth frame. The support mechanism 25 includes a conveying belt 60, a drive pulley 61, a driven pulley 62, and a sheet support member 63.

As shown in FIG. 2, the drive pulley 61 and the driven pulley 62 are located separately from each other in the front-rear direction. The conveying belt 60 is an endless belt stretched over the drive pulley 61 and the driven pulley 62. The drive pulley 61 is rotated by force generated by the motor. Thus, the drive pulley 61 pulls and rotates the conveying belt 60. The driven pulley 62 is rotated as the conveying belt 60 is pulled.

Figure 3:
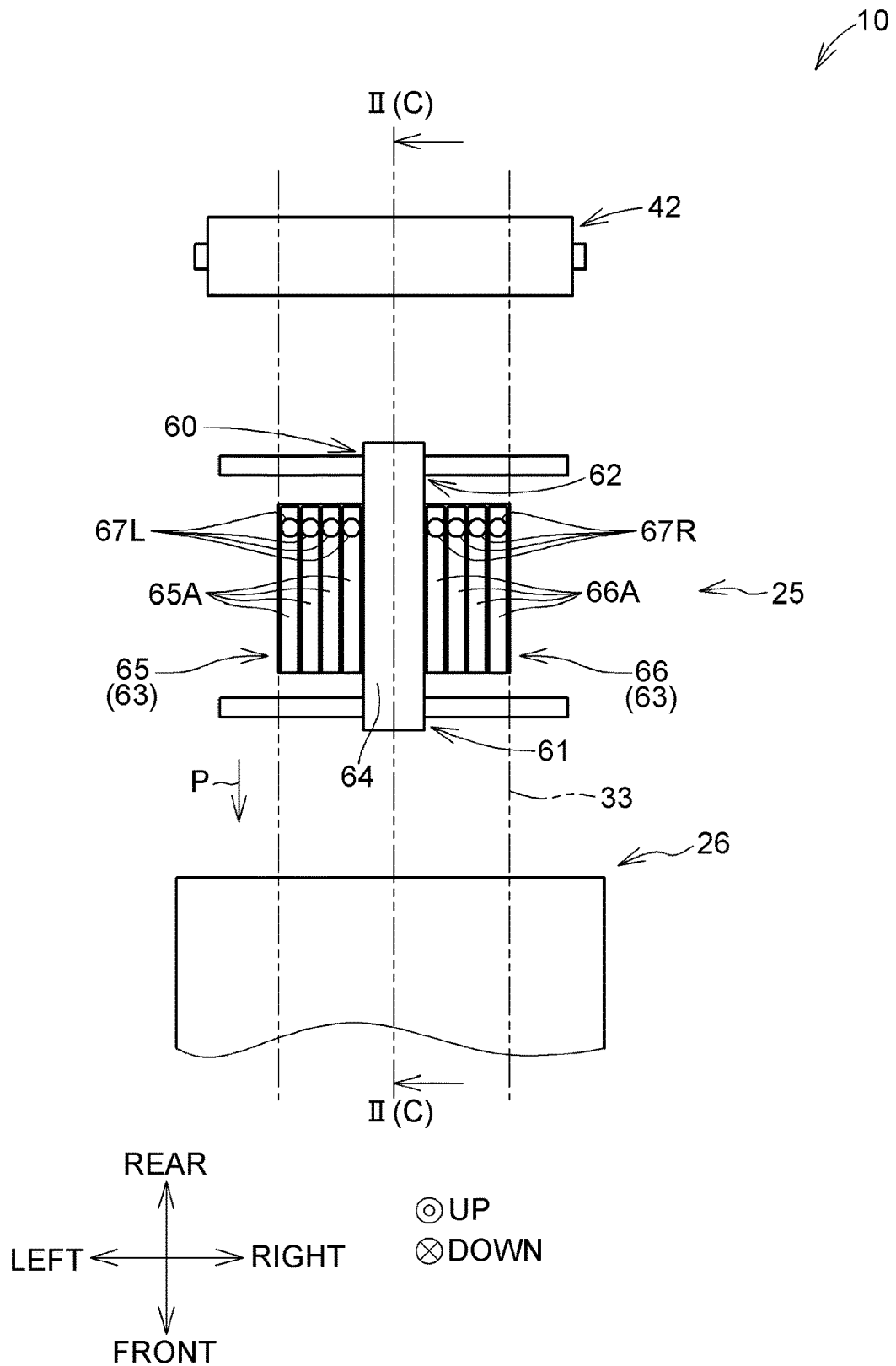
FIG. 3 is a schematic view of the periphery including the support mechanism 25 as viewed from above.

As shown in FIGS. 2 and 3, the conveying belt 60 has a conveying surface 64. The conveying surface 64 is a rectangular portion at an upper surface of the conveying belt 60. The conveying surface 64 faces the nozzle surface 71 of the recording head 24 in the vertical direction. A width of the conveying surface 64 in the left-right direction is less than a width of the sheet S in the left-right direction. The conveying surface 64 supports the sheet S from below between the conveying roller pair 41 and the heater 26. Thus, the conveying belt 60 applies a conveying force to the sheet S.

As shown in FIG. 3, the sheet support member 63 has a left support member 65 and a right support member 66. The left support member 65 is positioned on a left side of the conveying belt 60. The left support member 65 is in a box-shape and open forward and upward. The left support member 65 has a bottom wall, a rear wall, a left wall, and a right wall. The bottom wall is at bottom of the left support member 65. The rear wall at rear of the left support member 65. The left wall is at left of the left support member 65. The right wall is at right of the left support member 65. The left support member 65 has a left support surface for supporting the sheet S supported on the conveying surface 64 on the left of the conveying surface 64. The left support member 65 has a left flow path 65A recessed downward from the left support surface. The left flow path 65A extends in the front-rear direction and is open in the forward direction and an upward direction. The left support member 65 has a left through hole 67L. The left through hole 67L extends through the bottom wall of the left support member 65 in the vertical direction. The left through hole 67L is open upward at a rear end portion of the left flow path 65A. A plurality of left flow path 65A may be positioned in the left-right direction such that the left through hole 67L is positioned in each left flow path 65A.

The right support member 66 is located on a right side of the conveying belt 60. The right support member 66 is in a box-shaped and open forward and upward. The right support member 66 has a bottom wall, a rear wall, a left wall, and a right wall. The bottom wall is at bottom of the right support member 66. The rear wall is at rear of the right support member 66. The left wall is at left of the right support member 66. The right wall is at right of the right support member 66. The right support member 66 has a right support surface for supporting the sheet S supported by the conveying surface 64 on the right of the conveying surface 64. The right support member 66 has a right flow path 66A recessed downward from the right support surface. The right flow path 66A extends in the front-rear direction and is open in the forward direction and the upward direction. The right support member 66 has a right through hole 67R. The right through hole 67R extends through the bottom wall of the right support member 66 in the vertical direction. The right through hole 67R is open upward at a rear end portion of the right flow path 66A. A plurality of right flow paths 66A may be positioned in the left-right direction such that the right through-hole 67R is positioned in each right flow path 66A.

Each of the left through holes 67L is connected to a branch tube. Each of the right through holes 67R is connected to a branch tube. The branch tubes are connected to a single converging tube. A suction pump is connected to the single converging tube. When the suction pump is driven, an air flow in the direction opposite to the conveying direction P is generated in each left flow path 65A and each right flow path 66A. The air flow helps the sheet S contact the left supporting surface and the right supported surface. Thus, the sheet S is conveyed in the forward direction by the conveying force applied from the conveying belt 60 while contacting the left supporting surface of the left support member 65 and the right supporting surface of the right support member 66.

[Heater 26]

The heater 26 is positioned between the support mechanism 25 and the first transport roller pair 51 in the front-rear direction. The heater 26 is supported by the fifth frame. The heater 26 includes a heat transfer plate 73 and a film heater 74. The heat transfer plate 73 is made of metal. The heat transfer plate 73 has a support surface 73A at substantially the same height as the conveying surface 64 of the conveying belt 60. The support surface 73A extends in the front-rear direction and the left-right direction. The support surface 73A supports the lower surface of the sheet S fed from the support mechanism 25. The film heater 74 is fixed to the lower surface of the heat transfer plate 73. The film heater 74 includes a resin film, e.g., polyimide film, and also includes an electric heating wire on the resin film. The film heater 74 generates heat under the control of a controller. The heat is transferred through the heat transfer plate 73 to the sheet S on the heat transfer plate 73. The heat transferred to the sheet S heats the sheet S itself, the ink on the sheet S, and the ink impregnated in the sheet S, and evaporates water from the sheet S.

[Heater Cover 27]

The heater cover 27 is positioned slightly above the heater 26. As shown in FIG. 1B, the heater cover 27 extends between a left wall 14 and a right wall 20 of the housing cover 13 in the front-rear and left-right directions. The heater cover 27 is a rectangular parallelepiped box having a space therein, and covers the entire area of the support surface 73A of the heat transfer plate 73. The lower surface of the heater cover 27 has a slit. A third spur roller 75 is positioned in the heater cover 27. The third spur roller 75 is supported by the heater cover 27 so as to be rotatable around a rotating shaft parallel to the left-right direction. The lower end of the third spur roller 75 protrudes downward, through the slit, slightly from the lower surface of the heater cover 27. As shown in FIG. 2, three third spur rollers 75 project downward slightly from the lower surface of the heater cover 27 while the lower surface of the heater cover 27 has three slits, each corresponding to each of the three third spur rollers 75.

[Reference Plate 29]

The reference plate 29 is positioned between the first driving roller 28A and the second driving roller 28B in the front-rear direction. The reference plate 29 is supported by a sixth frame. The reference plate 29 has a support surface 29A. The support surface 29A is positioned substantially at the same height as an upper end of the first driving roller 28A and an upper end of the second driving roller 28B in the vertical direction. The support surface 29A extends in the front-rear direction and the left-right direction. The support surface 29A faces upward and is colored white.

[CIS Unit 30]

Figure 4:
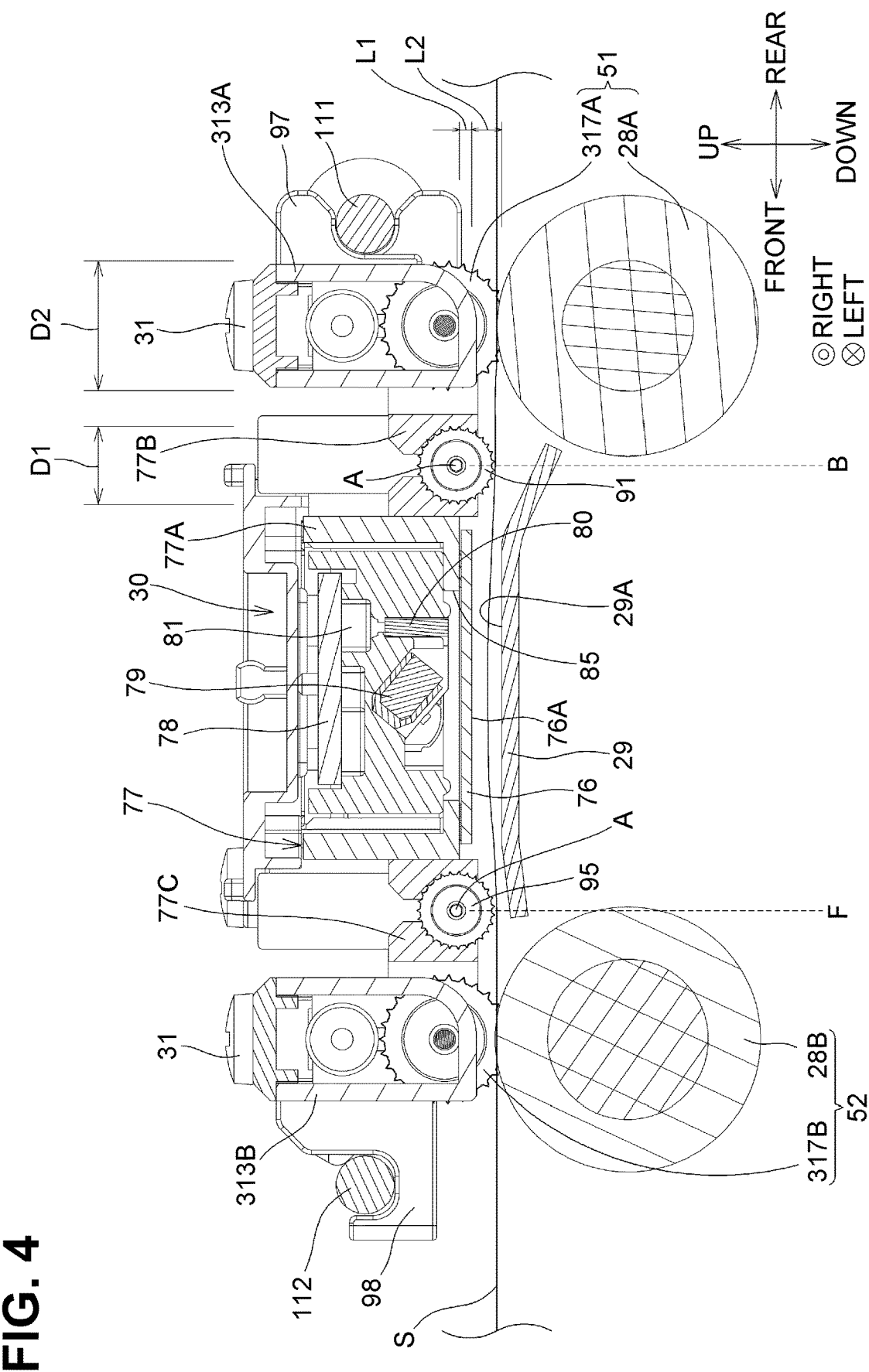
FIG. 4 is an enlarged view of the periphery including the CIS unit 30 in the longitudinal section of the housing cover 13 along line II-II of FIG. 1A.

The CIS unit 30 reads an image on the sheet S. The CIS unit 30 is positioned in front of the heater 26. More specifically, as shown in FIG. 4, the CIS unit 30 is positioned between first transport roller pair 51 and the second transport roller pair 52 in the front-rear direction. The CIS unit 30 is positioned over the reference plate 29 in the vertical direction. The CIS unit 30 is supported by a housing 77 positioned between the first transport roller pair 51 and the second transport roller pair 52 in the front-rear direction. The housing 77 is an example of a first support member.

The housing 77 has a main body 77A, a first support portion 77B, and a second support portion 77C. The main body 77A is a rectangular parallelepiped box that is longitudinal in the left-right direction. The main body 77A has an upper wall, a front wall, a rear wall, a left wall, a right wall, and a bottom wall. The upper wall is at top of the main body 77A. The front is at front of the main body 77A. The rear wall is at rear of the main body 77A. The left is at left of the main body 77A. The right wall is at right of the main body 77A. The bottom wall is at bottom of the main body 77A. The bottom wall has an opening 85 such that an inner space of the main body 77A is open downward. The opening 85 faces the reference plate 29 in the vertical direction. The opening 85 extends in the front-rear direction and the left-right direction. The opening 85 is longitudinal in the left-right direction rather than in the front-rear direction. The CIS unit 30 includes, in the inner space of the main body 77A, a substrate 78, an LED array 79, a rod lens array 80, and a line sensor 81. The LED array 79 is an example of a light source. The line sensor 81 is an example of a light receiving portion.

The substrate 78 is positioned on the upper side in the vertical direction in the inner space of the main body 77A. The substrate 78 has a flat plate shape extending in the front-rear direction and the left-right direction. The LED array 79 and the line sensor 81 are mounted on the substrate 78.

The LED array 79 emits light from the LEDs toward the sheet S. The rod lens array 80 is positioned immediately below the line sensor 81. The rod lens array 80 includes a plurality of rod lenses arranged in the left-right direction. The rod lens array 80 focuses the reflected light from the sheet S on the line sensor 81. The line sensor 81 has a plurality of photodiodes (PDs) arranged in the left-right direction. The line sensor 81 outputs data having levels corresponding to each PD in accordance with the amount of incident light to each PD.

A glass plate 76 is disposed between the LED array 79 and the reference plate 29. The glass plate 76 is positioned below the opening 85 in the vertical direction. The glass plate 76 is fixed to the lower surface of the main body 77A. The glass plate 76 extends in the front-rear direction and the left-right direction. The glass plate 76 is longitudinal in the front-rear direction and the left-right direction rather than the opening 85. In other words, the glass plate 76 covers the opening 85 entirely. The length of the glass plate 76 in the left-right direction is greater than the length of the glass plate 76 in the left-right direction. An upper surface and a lower surface 76A of the glass plate 76 have a rectangular shape that is longitudinal in the left-right direction. A thickness L1 of the glass plate 76 is less than the vertical distance L2 between the lower surface 76A of the glass plate 76 and the support surface 29A of the reference plate 29. The thickness L1 of the glass plate 76 is in a range of 0.4 mm to 1.0 mm. The distance L2 is in a range of 1.2 mm to 2.2 mm. The distance L2 is an example of the shortest distance. The glass plate 76 transmits light emitted from the LED array 79 and reflected light, which is emitted from the LED array 79, reflected by the sheet S.

The first support portion 77B is located at a rear position B in the front-rear direction of the CIS unit 30, as shown in FIG. 4. The rear position B is between the first spur roller 317A and the CIS unit 30 in the front-rear direction. The rear position B is an example of the first position. The first support portion 77B is located on the rear surface of the rear wall of the main body 77A. The first support portion 77B extends in the left-right direction. The length of the first support portion 77B in the left-right direction is substantially equal to the length of the glass plate 76 in the left-right direction. The first support portion 77B has a U-shaped cross-sectional shape when viewed to left from right. The first support portion 77B has a front wall, a rear wall, and a bottom wall. The front wall faces the rear wall. The bottom wall is connected with the front wall and the rear wall such that the front wall, the rear wall and the bottom wall are arranged to make the U-shape. As shown in FIG. 5, the first support portion 77B has a first slit 82 extending in the front-rear direction and through the bottom wall in the vertical direction. The first slit 82 is positioned at the center of the bottom wall of the first support portion 77B in the left-right direction. The position of the first slit 82 in the left-right direction coincides with the center of the conveying path 33 in the left-right direction. The first support portion 77B supports a fourth spur roller 91. The fourth spur roller 91 is an example of a first rotating body.

As shown in FIG. 4, the fourth spur roller 91 protrudes downward from the bottom wall of the first support portion 77B through the first slit 82. The fourth spur roller 91 is positioned at the center of the conveying path 33 in the left-right direction. The fourth spur roller 91 is supported by the U-shaped inner surface of the first support portion 77B so as to be rotatable about the axis A. The axis A extends in the left-right direction. The fourth spur roller 91 has the same shape as the first spur roller 317A and the second spur roller 317B. The fourth spur roller 91 is smaller than the first spur roller 317A. The fourth spur roller 91 has a rotating portion 91A and a plurality of projections 91B.

A thickness of the rotating portion 91A in the left-right direction is greater than a thickness of the projection 91B in the left-right direction. The plurality of projections 91B project radially outward from the outer peripheral surface of the rotating portion 91A. The plurality of projections 91B are arranged at equal intervals over the entire circumference along the rotational direction of the rotating portion 91A. The thickness of each protrusion 91B in the left-right direction is less than the thickness of the rotating portion 91A in the left-right direction. A distal end 91BB of each projection 91B is smaller than a base end of each projection 91B. Each projection 91B is tapered when viewed from the left-right direction. As shown in FIG. 4, each projection 91B has a triangular shape when viewed to left from right. The distal end 91BB of each projection 91B is positioned on a virtual circle centered on the rotation center of the rotating portion 91A.

The outer diameter D1 of the fourth spur roller 91 is less than the outer diameter D2 of the first spur roller 317A. The outer diameter D1 of the fourth spur roller 91 is a diameter of an imaginary circle including the distal ends 91BB of the plurality of projections 91B. The outer diameter D2 of the first spur roller 317A is a diameter of an imaginary circle including a plurality of distal ends projecting from the outer peripheral surface of the first spur roller 317A. The distal ends 91BB of the plurality of projections 91B are positioned below the lower surface 76A of the glass plate 76 as the fourth spur roller 91 rotates. In other words, as the fourth spur roller 91 rotates, the distal ends 91BB of the plurality of projections 91B are positioned closer to the support surface 29A of the reference plate 29 than the lower surface 76A of the glass plate 76 in the conveying path 33.

As shown in FIG. 4, the second support portion 77C is positioned at a front position F of the CIS unit 30 in the front-rear direction. The front position F is between the second spur roller 317B and the CIS unit 30 in the front-rear direction. The front position F is an example of the second position. The second support portion 77C is located on a front surface of the front wall of the main body 77A. The second support portion 77C extends in the left-right direction. The length of the second support portion 77C in the left-right direction is substantially equal to the length of the glass plate 76 in the left-right direction. The second support portion 77C has a U-shaped cross-section when viewed from the left-right direction. The second support portion 77C has a front wall, a rear wall, and a bottom wall. The front wall faces the rear wall. The bottom wall is connected with the front wall and the rear wall such that the front wall, the rear wall and the bottom wall are arranged to make the U-shape. The second support portion 77C has a second slit 93 extends in the front-rear direction and through the bottom wall in the vertical direction. As shown in FIG. 5, the second slit 93 is positioned at the center of the bottom wall of the second support portion 77C in the left-right direction. The position of the second slit 93 in the left-right direction coincides with the center of the conveying path 33 in the left-right direction. The second support portion 77C supports a fifth spur roller 95. The fifth spur roller 95 is an example of a second rotating body.

The fifth spur roller 95 projects downward from the bottom wall of the second support portion 77C through the second slit 93. As shown in FIG. 5, the fifth spur roller 95 is positioned at the center of the conveying path 33 in the left-right direction. The fifth spur roller 95 is supported by the U-shaped inner surface of the second support portion 77C so as to be rotatable about the axis A. The shape and size of the fifth spur roller 95 are identical to the shape and size of the fourth spur roller 91. Therefore, as shown in FIG. 5, elements of the fifth spur roller 95 are denoted by the same reference numerals as the elements of the fourth spur roller 91.

[Spur Holder Unit 31]

As shown in FIG. 4, the spur holder unit 31 is located above the first driving roller 28A and the second driving roller 28B. The spur holder unit 31 has a first spur holder 313A supporting the first spur roller 317A and a second spur holder 313B supporting the second spur roller 317B.

The first spur holder 313A is positioned behind the first support portion 77B and above the first driving roller 28A. The first spur holder 313A vertically faces the first driving roller 28A in the conveying path 33. The first spur holder 313A has an outer peripheral in a substantially rectangular parallelepiped shape that is longitudinal beyond the first support portion 77B in the left-right direction. In other words, the first spur holder 313A extends further outward than the first support portion 77B, in the left-right direction. The first spur holder 313A has an inner space that is longitudinal in the vertical direction rather than in the front-rear direction when viewed to left from right. The first spur holder 313A has a U-shaped cross-section when viewed to left from right. The first spur holder 313A has a front wall, a rear wall and a bottom wall. The front wall faces the rear wall. The bottom wall is connected with the front wall and the rear wall such that the front wall, the rear wall and the bottom wall are arranged to make the U-shape. The first spur holder 313A has a plurality of third slits, each extending in the front-rear direction and through the bottom wall in the vertical direction. The plurality of third slits is positioned at intervals in the left-right direction. The first spur roller 317A protrudes downward from the bottom wall of the first spur holder 313A through each third slit. Each first spur roller 317A is rotatably supported by an inner wall of the first spur holder 313A. A first fitting portion 97 extending rearward from a rear surface of the first spur holder 313A is located on a rear wall of the first spur holder 313A.

The second spur holder 313B is positioned in front of the second support portion 77C and above the second driving roller 28B. The second spur holder 313B vertically faces the second driving roller 28B in the conveying path 33. The second spur holder 313B rotatably supports the second spur roller 317B. The shape and size of the second spur roller 313B are identical to the shape and size of the first spur holder 313A. A front wall of the second spur holder 313B has a second fitting portion 98 extending forward from a front surface of the front wall.

The first spur holder 313A and the second spur holder 313B are coupled in the front-rear direction with a left coupling member and a right coupling member. The left coupling member couples a left end portion of the first spur holder 313A with a left end portion of the second spur holder 313B in the front-rear direction. The right coupling member couples a right end portion of the first spur holder 313A with a right end portion of the second spur holder 313B in the front-rear direction. The first spur holder 313A and the second spur holder 313B need not be coupled to each other.

A first shaft 111 and a second shaft 112 are fixed to a seventh frame disposed on the housing cover 13. The first shaft 111 is located rearwardly of and with a space from the second shaft 112. The first shaft 111 and the second shaft 112 extend in the left-right direction. The first shaft 111 and the second shaft 112 support the spur holder unit 31. The first shaft 111 is fitted with the first fitting portion 97. The second shaft 112 is fitted with the second fitting portion 98.

[Operation of Printer 10]

When the printer 10 receives print data indicating an image to be recorded on the sheet S from an information processing device capable of communicating with the printer 10, the printer 10 executes image recording. The information processing apparatus may be a PC.

While an image is recorded, the roll body 38, the drive roller 42, the drive pulley 61, the first driving roller 28A, and the second driving roller 28B rotate. Thus, the sheet S is fed from the roll body 38 and conveyed toward the tensioner 22.

The conveying roller pair 41 nips the sheet S to which tension is applied by the tensioner 22, and conveys the sheet S in the forward direction toward the conveying surface 64 of the conveying belt 60. The conveying belt 60 conveys the sheet S further forward, using the conveying surface 64 which runs forward. The sheet S is conveyed while contacting the left support surface of the left support member 65 and the right support surface of the right support member 66. The recording head 24 discharges ink from each nozzle 70 toward the sheet S supported by the support mechanism 25 based on print data. Thus, an image with ink is recorded on the sheet S. The sheet S on which an image is recorded is conveyed between the heater 26 and the heater cover 27, and is further conveyed forward onto the support surface 73A of the heat transfer plate 73. Heat generated by the film heater 74 is applied to the sheet S via the heat transfer plate 73. The generated heat evaporates moisture on or in the sheet S on which the image is recorded. Then the ink is dried so that the image is fixed to the sheet S.

The sheet S that has passed through the heater 26 is nipped between the first driving roller 28A and the first spur roller 317A, and is further conveyed forward. The sheet S conveyed forward is further nipped between the second driving roller 28B and the second spur roller 317B while being supported by the support surface 29A of the reference plate 29. The sheet S is further conveyed forward. Here, the distal ends 91BB of the plurality of projections 91B of the fourth spur roller 91 come into contact with the sheet S to rotate the fourth spur roller 91. At the same time, the distal ends 91BB of the plurality of projections 91B of the fifth spur roller 95 come into contact with the sheet S to rotate the fifth spur roller 95. As a result, the plurality of projections 91B of the fourth spur roller 91 and the fifth spur roller 95 push down the sheet S as shown in FIG. 4 such that the sheet S, which is wound around the roll body 38 and has a curl, would not rise with respect to the support surface 29A.

The CIS unit 30 optically reads the image on the sheet S and outputs read data indicating the reading result to the controller. As the fourth spur roller 91 and the fifth spur roller 95 push down the sheet S, the posture of the sheet S is stable below the CIS unit 30 such that the CIS unit 30 reads the image accurately. The controller determines quality of the image on the sheet S based on the read data. After the image is read, the sheet S is discharged from the discharge port 16.

Function and Advantage of Embodiment

The plurality of projections 91B of the fourth spur roller 91 come into contact with the sheet S while the sheet S is conveyed in the conveying path 33 between the first transport roller pair 51 and the CIS unit 30. Further, the plurality of projections 91B of the fifth spur roller 95 come into contact with the sheet S while the sheet S is conveyed in the conveying path 33 between the second transport roller pair 52 and the CIS unit 30. As a result, the plurality of projections 91B of the fourth spur roller 91 and the fifth spur roller 95 push down the sheet S onto the support surface 29A. Therefore, the sheet S does not contact the lower surface 76A of the glass plate 76 so the undried ink on the sheet S does not contact the glass plate 76.

The fourth spur roller 91 and the fifth spur roller 95 have a plurality of projections 91B projecting radially outward from the outer peripheral surface of the rotating portion 91A. The projection 91B comes into contact with the sheet S, however, if there were no projection 91B, the rotating portion 91A would contact the sheet S. The contact area between the projection 91B and the sheet S would be less than the contact area between the rotating portion 91A and the sheet S. Therefore, it could be said that the contact area between the fourth spur roller 91 and the fifth spur roller 95 and the sheet S is relatively small. Therefore, the fourth spur roller 91 and the fifth spur roller 95 are less likely to contact the undried ink on sheet S such that the undried ink is not spread on the sheet S.

The first support portion 77B for supporting the fourth spur roller 91 is positioned at the rear position B of the CIS unit 30. The second support portion 77C for supporting the fifth spur roller 95 is positioned at the front position F of the CIS unit 30. The fourth spur roller 91 contacts the sheet S at the rear position B. The fifth spur roller 95 contacts the sheet S at the front position F. Accordingly, the fourth spur roller 91 and the fifth spur roller 95 jointly push down the sheet S. As a result, the sheet S is more reliably away from the lower surface 76A of the glass plate 76, compared with a case where only one of the fourth spur roller 91 and the fifth spur roller 95 is in contact with the sheet S.

Since the fourth spur roller 91 and the fifth spur roller 95 are positioned at the center in the left-right direction of the conveying path 33, the fourth spur roller 91 and the fifth spur roller 95 come into contact with the center of the sheet S in the left-right direction. Therefore, the sheet S is uniformly pushed down in the left-right direction such that the sheet S is more reliably away from the lower surface 76A of the glass plate 76.

The CIS unit 30, the fourth spur roller 91, and the fifth spur roller 95 are supported by the housing 77. Therefore, the glass plate 76 of the CIS unit 30 is highly accurately positioned with respect to the fourth spur roller 91 and the fifth spur roller 95. Therefore, the plurality of projections 91B of the fourth spur roller 91 and the fifth spur roller 95 more reliably push down the sheet S such that the sheet S is away from the glass plate 76.

The outer diameter of the fourth spur roller 91 and the outer diameter of the fifth spur roller 95 are less than the outer diameter of the first spur roller 317A and the outer diameter of the second spur roller 317B. Therefore, compared with the case where the outer diameter D1 of the fourth spur roller 91 is greater than the outer diameter D2 of the first spur roller 317A, the fourth spur roller 91 contacts the sheet S at a position close to the glass plate 76 in the front-rear direction. Further, compared with the case where the outer diameter D1 of the fifth spur roller 95 is greater than the outer diameter D2 of the second spur roller 317B, the fifth spur roller 95 contacts the sheet S at a position close to the glass plate 76 in the front-rear direction. Therefore, the sheet S is more reliably away from the lower surface 76A of the glass plate 76.

The thickness L1 of the glass plate 76 is less than the distance L2 in the vertical direction between the lower surface 76A of the glass plate 76 and the support surface 29A of the reference plate 29. In other words, the distance L2 is greater than the thickness L1 of the glass plate 76. Thus, the sheet S conveyed by the first transport roller pair 51 is more reliably away from the lower surface 76A of the glass plate 76.

The sheet S may be deformed by the heat of the heater 26, however, since the fourth spur roller 91 contacts and pushes down the sheet S heated by the heater 26, the sheet S is away from the lower surface 76A of the glass plate 76. Therefore, the undried ink on the sheet S does not contact the lower surface 76A of the glass plate 76.

Modified Example

Although the printer 10 includes the fourth spur roller 91 and the fifth spur roller 95, either one of the fourth spur roller 91 and the fifth spur roller 95 may be omitted.

As shown in FIG. 6, a plurality of fourth spur rollers 91 may be supported at the first support portion 77B such that the plurality of fourth spur rollers 91 are spaced apart from each other in the left-right direction.

Similarly, as shown in FIG. 6, a plurality of fifth spur rollers 95 may be supported at the second support portion 77C such that the plurality of fifth spur rollers 95 are spaced apart from each other in the left-right direction.

Each of the projections 91B may be in any shape having the distal end smaller in the front-rear direction than the base end. For example, the projection 91B may be formed into a half-elliptical shape obtained by dividing an ellipse into two along its minor axis. Here, the projection 91B extends from the outer peripheral surface of the rotating portion 91A so that the major axis of the projection 91B is along the radial direction of the rotating portion 91A.

The projections 91B may be randomly positioned on the outer peripheral surface of the rotating section 91A.

The fourth spur roller 91 may be supported by a shaft fixed to an eighth frame positioned near the left and right ends in the inner space 11. The fifth spur roller 95 may be supported by a shaft fixed to a ninth frame positioned near left and right ends in the inner space 11.

The heater 26 may be omitted such that ink that is not required to be heated is used.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

What is claimed is:

1. An image reading apparatus comprising:
a housing having a conveying path extending in a conveying direction;
a recording head;
a first transport roller pair located downstream of the recording head in the conveying direction and including a first driving roller and a first driven roller;
a second transport roller pair located downstream of the first transport roller pair in the conveying direction and including a second driving roller and a second driven roller;
a reading unit located between the first transport roller pair and the second transport roller pair in the conveying direction;
a sheet support portion facing the reading unit;
a glass plate located between the reading unit and the sheet support portion; and
a rotating body located at a first position or a second position, the first position being between the first transport roller pair and the reading unit, the second position being between the reading unit and the second transport roller pair in the conveying direction;
a first support member that supports the reading unit and the rotating body;
a second support member that supports the first driven roller and the second driven roller,
wherein the reading unit further comprises:
a light source for irradiating the sheet support portion with light through the glass plate; and
a light receiver for receiving light through the glass plate;
wherein the rotating body has a plurality of projections projecting radially outwardly, and
wherein a distal end of one of the plurality of projections is positioned closer to the sheet support portion than the glass plate.

2. The image reading apparatus according to claim 1,
wherein the rotating body includes:
a first rotating body positioned at the first position, and
a second rotating body positioned at the second position.

3. The image reading apparatus according to claim 1,
wherein the rotating body is provided at the center of the conveying path in an intersecting direction orthogonal to the conveying direction.

4. The image reading apparatus according to claim 1,
wherein an outer diameter of the rotating body is less than an outer diameter of the first driven roller and an outer diameter of the second driven roller.

5. The image reading apparatus according to claim 4,
wherein a plurality of the rotating bodies is positioned at intervals in an intersecting direction orthogonal to the conveying direction.

6. The image reading apparatus according to claim 5,
wherein a thickness of the glass plate is less than the shortest distance between the glass plate and the sheet support portion.

7. The image reading apparatus according to claim 6 further comprising:
a heater located between the recording head and the first transport roller pair in the conveying direction.

* * * * *